United States Patent
Tu et al.

(10) Patent No.: US 11,739,796 B2
(45) Date of Patent: Aug. 29, 2023

(54) UNIVERSAL JOINT CONNECTOR AND UNIVERSAL JOINT

(71) Applicant: STANLEY BLACK & DECKER MEA FZE, Dubai (AE)

(72) Inventors: Ching-Yi Tu, Taichung (TW); Yi Tung Chan, Taichung (TW)

(73) Assignee: STANLEY BLACK & DECKER MEA FZE, Dubai (AE)

( * ) Notice: Subject to any disclaimer, the term of this patent is extended or adjusted under 35 U.S.C. 154(b) by 330 days.

(21) Appl. No.: 17/210,107

(22) Filed: Mar. 23, 2021

(65) Prior Publication Data

US 2021/0301881 A1 Sep. 30, 2021

(30) Foreign Application Priority Data

Mar. 24, 2020 (EP) ..................................... 20165316

(51) Int. Cl.
 *F16D 3/38* (2006.01)
 *F16D 3/40* (2006.01)

(52) U.S. Cl.
 CPC ............... *F16D 3/387* (2013.01); *F16D 3/40* (2013.01)

(58) Field of Classification Search
 CPC ....... B23B 23/0028; F16D 3/26; F16D 3/265; F16D 3/38; F16D 3/387; Y10T 403/32041; Y10T 403/32049; Y10T 403/32181
 USPC ..... 464/114, 153; 403/57, 58, 74; 81/177.75
 See application file for complete search history.

(56) References Cited

U.S. PATENT DOCUMENTS

| 541,997 A | * | 7/1895 | Fravega | F16D 3/38 81/177.75 |
| 1,185,199 A | * | 5/1916 | Hauer | F16D 3/38 464/119 |
| 2,005,202 A | * | 6/1935 | Pilger | F16D 3/38 81/177.75 |
| 2,826,052 A | * | 3/1958 | Stillwagon, Jr. | F16D 3/38 464/119 |
| 5,433,548 A | * | 7/1995 | Roberts | F16D 3/40 81/177.85 |
| 5,660,491 A | * | 8/1997 | Roberts | F16D 3/40 81/177.85 |

(Continued)

FOREIGN PATENT DOCUMENTS

| CN | 106090048 A | 11/2016 |
| CN | 108591292 A | 9/2018 |

(Continued)

OTHER PUBLICATIONS

Extended European Search Report for EP Application No. 20165316.9 dated Oct. 5, 2020, 7 pages.

*Primary Examiner* — Josh Skroupa
(74) *Attorney, Agent, or Firm* — Caeden C. Drayton

(57) ABSTRACT

A central connector for a universal joint and a universal joint utilizing said central connector. The central connector includes a substantially cylindrical body. The connector further includes a first and second pair of arms positioned orthogonal to one another. The body of the central connector also includes a male spherically concave surface between the first pair of arms, a female spherically concave surface between the second pair of arms. The body further defines an opening allowing communication between the male and female spherically concave surfaces.

6 Claims, 8 Drawing Sheets

(56) References Cited

U.S. PATENT DOCUMENTS

| | | | |
|---|---|---|---|
| 8,151,671 B2* | 4/2012 | Chen | B25B 23/0014 403/57 |
| 10,919,132 B2* | 2/2021 | Huang | B25B 23/0028 |
| 2009/0041535 A1* | 2/2009 | Hu | F16D 3/40 403/57 |
| 2017/0209991 A1* | 7/2017 | Lee | B25B 23/0028 |

FOREIGN PATENT DOCUMENTS

| | | |
|---|---|---|
| FR | 1335740 A | 8/1963 |
| KR | 101581460 B1 | 12/2015 |

* cited by examiner

UNIVERSAL JOINT CONNECTOR AND UNIVERSAL JOINT

This patent application claims priority to EP application No. 20165316.9, filed Mar. 24, 2020, which is hereby incorporated by reference in its entirety.

FIELD OF THE INVENTION

The present invention relates to a central connector for a universal joint and a universal joint.

BACKGROUND OF THE INVENTION

Universal joints are useful tools for transmitting torque to an object in tight spaces or at odd/awkward angles. Universal joints are well known and generally operate by connecting torque transmitting rods whose axes are inclined to each other. The torque transmitting rods may include a female socket and a male driver. The female socket and male driver are typically bound together by a pair of hinges positioned close to one another, oriented at 90 degrees and connected by a cross shaft. The universal joint may also include set springs that holds the female socket and male driver in a selected position FIGS. 1 and 2 respectively illustrate two different examples of universal joints 500, 600 according to the prior art. Both examples include central connector 510, 610, a male driver 512, 612, and a female socket 514, 614. The central connectors 510, 610 each define a male bore 516, 616 and a female bore 518, 618 that are positioned orthogonally to one another. The male drivers also define bores 520, 620. Similarly, the female sockets also define bores 522, 622. The bore of the male driver 520, 620 and corresponding male bore of the central connector 516, 616 are configured to receive a male axle 524, 624. Likewise, the bore of the female driver 522, 622 and corresponding female bore of the central connector 518, 618 are configured to receive a female axle 526, 626. Each example also includes a male set spring 528, 628 and female set spring 530, 630. These set springs are positioned in the bores with the corresponding male or female axle. The set springs are configured to hold the respective male driver and female socket in an orientation selected by the user.

The two examples of the prior art differ from one another in the way that the respective male drivers/female sockets connect to the central connector. In example 500, the bore 520 of the male driver 512 is a stirrup type bore that is configured to be positioned outside of the block type central connector 510. The bore 522 of the female socket 514 is also a stirrup type bore that is configured to be positioned on the outside of the block type central connector 510. Conversely, in example 600, the bores 616, 618 of the central connector 610 are of the stirrup type. These bores are respectively configured to be positioned on the outside of the male driver and female socket.

When new, universal joints operate well to transmit torque at odd angles. But over time, that usefulness wanes. One common complaint of universal joints is they may fail or break because the torque is transmitted through the relatively weak points of the male axle and female axle. Moreover, even if the universal joint does not fail, over time, the openings that house the set springs that holds the male driver and/or female socket in place wear out such that these elements will not remain in their selected positions.

The present invention overcomes one or more of the foregoing shortcomings.

SUMMARY OF THE INVENTION

According to an aspect of the invention, a central connector 110 for a universal joint 100 having a substantially cylindrical body 132 formed about an X-axis. The central connector also includes a first pair of arms 134 that are integral to the body 132 and equidistant from the X-axis, wherein said first pair of arms 134 are positioned at a first end 136 of the body 132, and wherein the first pair of arms 134 define openings configured to receive a male axle positioned on a Z-axis orthogonal to the X-axis. The central connector 110 also includes a second pair of arms 142 that are integral to the body 132 and equidistant from the X-axis, wherein said second pair of arms 142 are positioned at a second end 144 of the body 132 opposite to the first end 136, and wherein the second pair of arms 142 are oriented such that they are ninety degrees out of phase with the first pair of arms 134, and wherein the second pair of arms 142 define openings 146 configured to receive a female axle positioned on a Y-axis orthogonal to both the X-axis and the Y-axis. The central connector 110 is characterized in that the body 132 further includes a male spherically concave surface 150 between the first pair of arms 134, a female spherically concave surface 152 between the second pair of arms 142. In an alternative embodiment, the body 132 may further defines an opening 154 about the X-axis allowing communication between the male and female spherically concave surfaces 150, 152.

According to another aspect of the invention, is a universal joint 100 comprising a central connector 110 as described above. The universal joint 100 also includes a male connector 112 comprising a square joint 156 and a male stirrup 158 defining an axial opening 160, and wherein a tip 162 of the male stirrup 158 is spherical and configured to be received by the male spherically concave surface 150 of the central connector 110. The universal joint 100 also includes a female connector 114 comprising a square socket 170 and a female stirrup 172 defining an axial opening 174, and wherein a tip 176 of the female stirrup is spherical and configured to be received by the female spherically concave surface 152 of the central connector 110. The universal joint 100 further includes a male axle 140 disposed within the openings 138 of the first pair of arms 134 and the axial opening 160 of the male stirrup 158, and configured to secure the male connector 112 to the central connector, while simultaneously allowing the male connector 112 to rotate about the Z-axis. The universal joint 100 also includes a female axle 148 disposed within the opening 146 of the second pair of arms 142 and the axial opening 174 of the female stirrup 172, and configured to secure the female connector 114 to the central connector 110, while simultaneously allowing the female connector 114 to rotate about the Y-axis. The universal joint 100 may also include a positioning spring 180 disposed in the body opening 154 about the X-axis and configured to engage the tips 162, 176 of the male stirrup 158 and the female stirrup 172 to hold the respective male connector 112 and female connector 114 in a selected position.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of the central connector and universal joint in accordance with one or more embodiments are shown in the drawings, in which like reference numerals designate like elements. The drawings form part of this original disclosure in which.

DETAILED DESCRIPTION OF THE
ILLUSTRATED EMBODIMENT(S)

Figure 3:
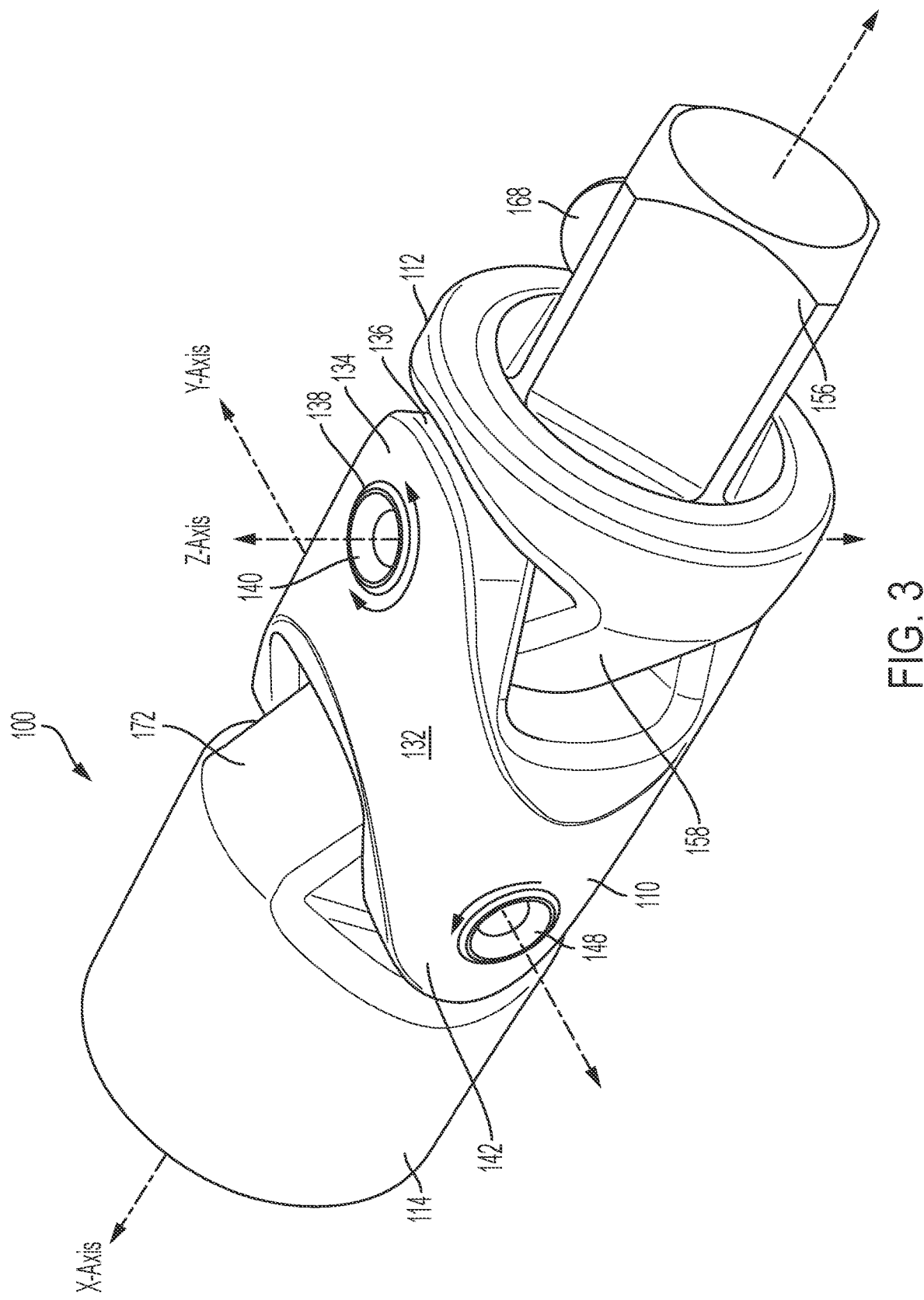
FIG. 3 illustrates a perspective view of the universal joint according to the present invention.
Figure 4:
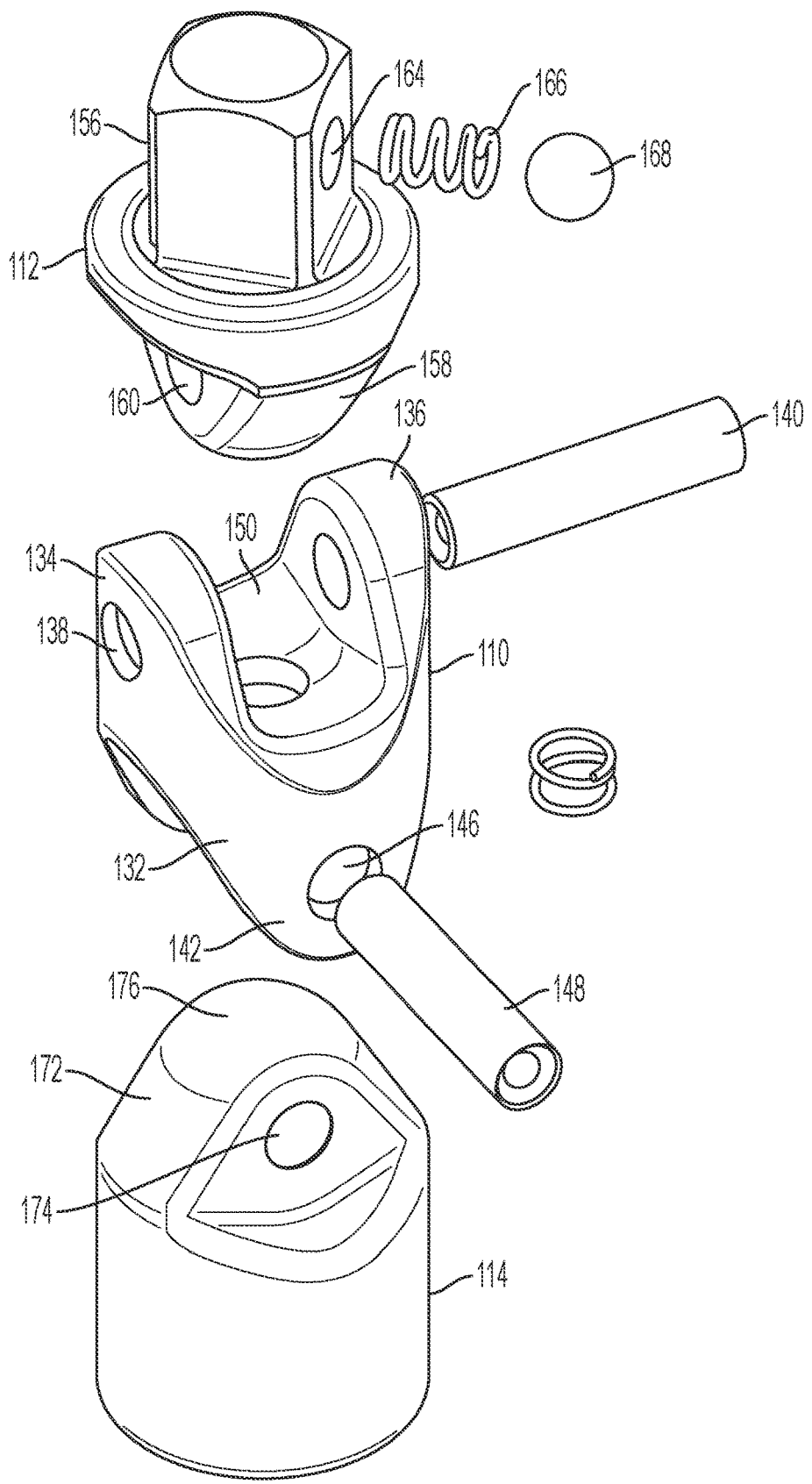
FIG. 4 illustrates an exploded view of the universal joint according to the present invention.
Figure 5:
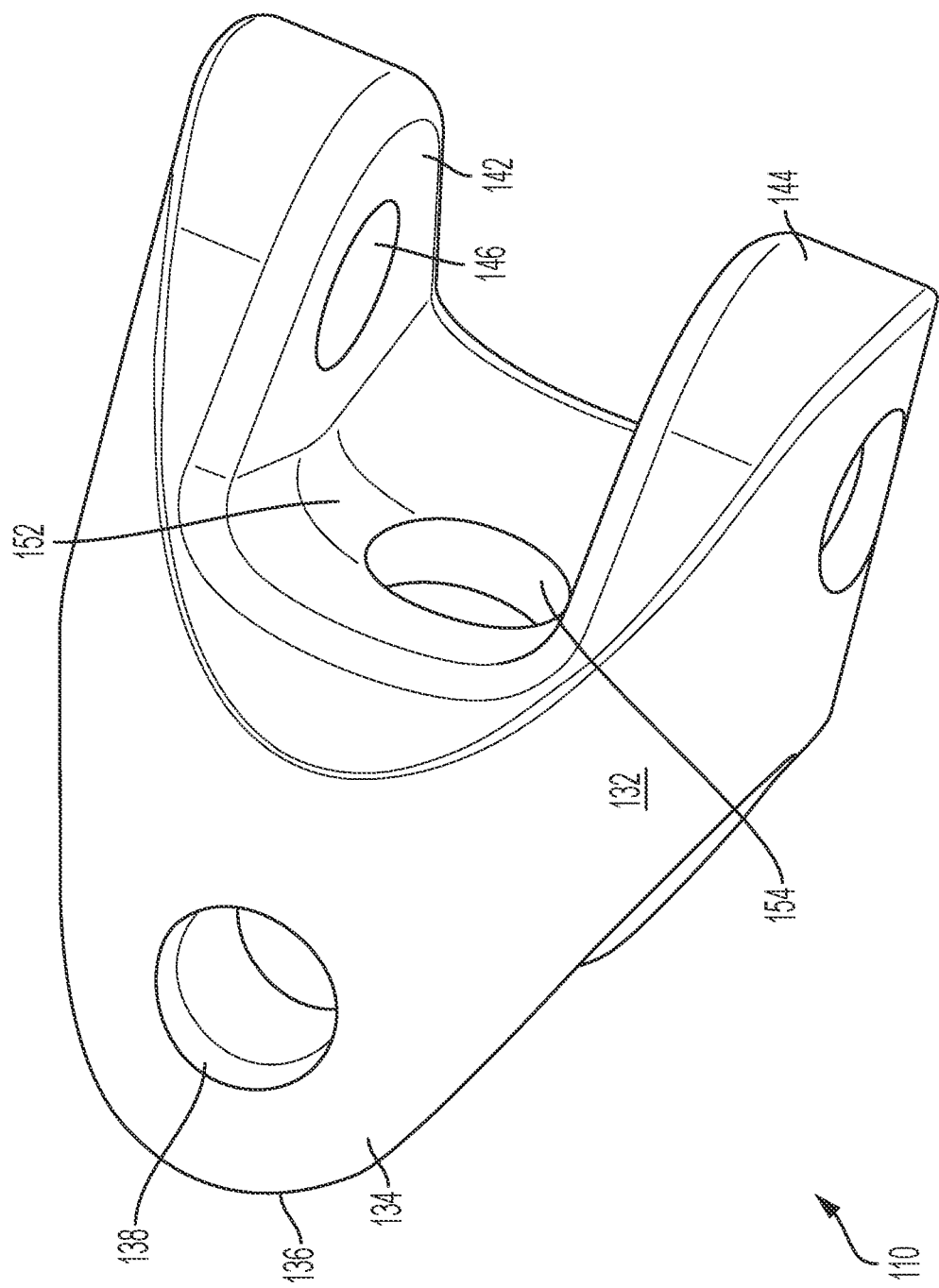
FIG. 5 illustrates a perspective view of a central connector according to the present invention.
Figure 6:
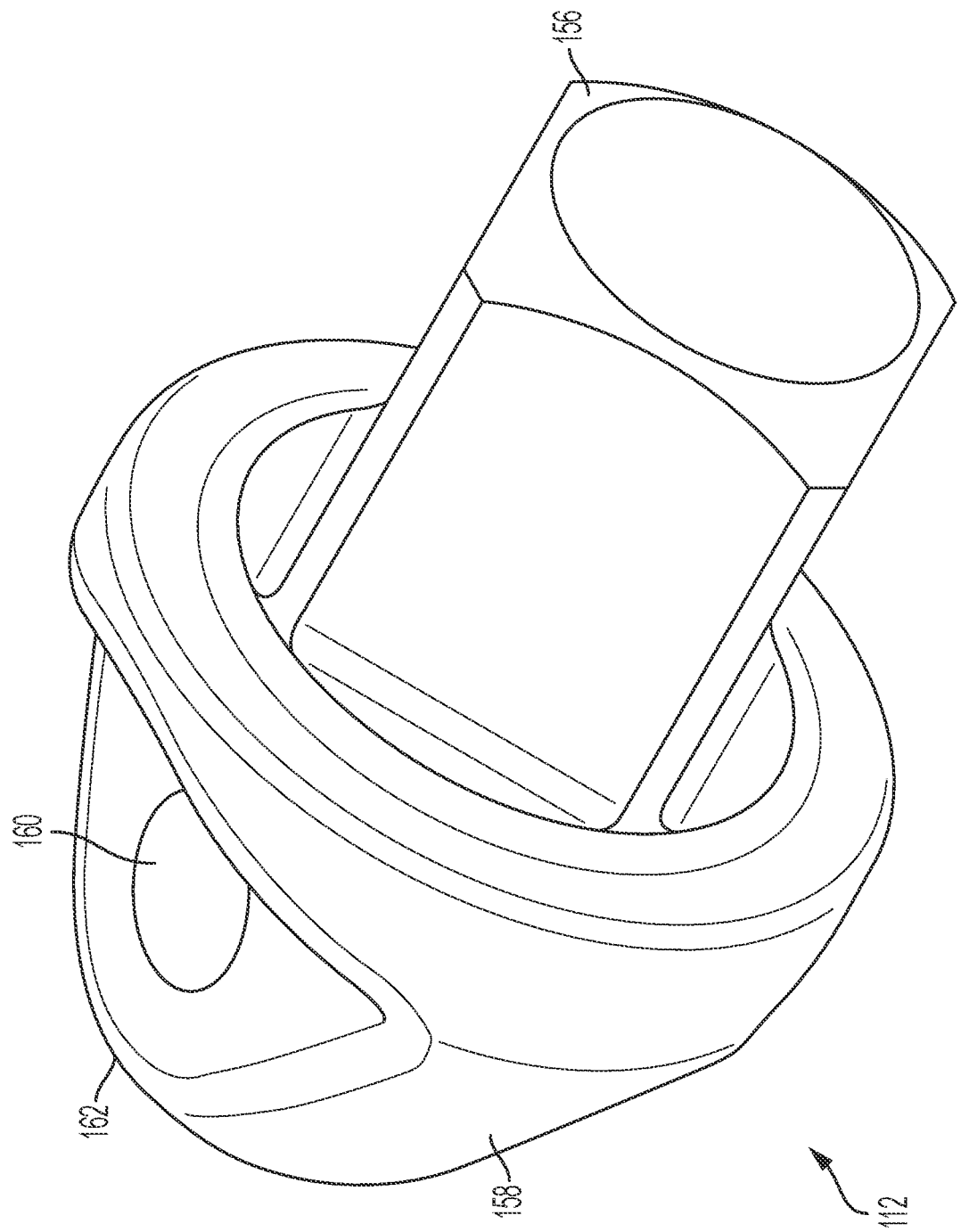
FIG. 6 is a perspective view of the male driver.
Figure 7:
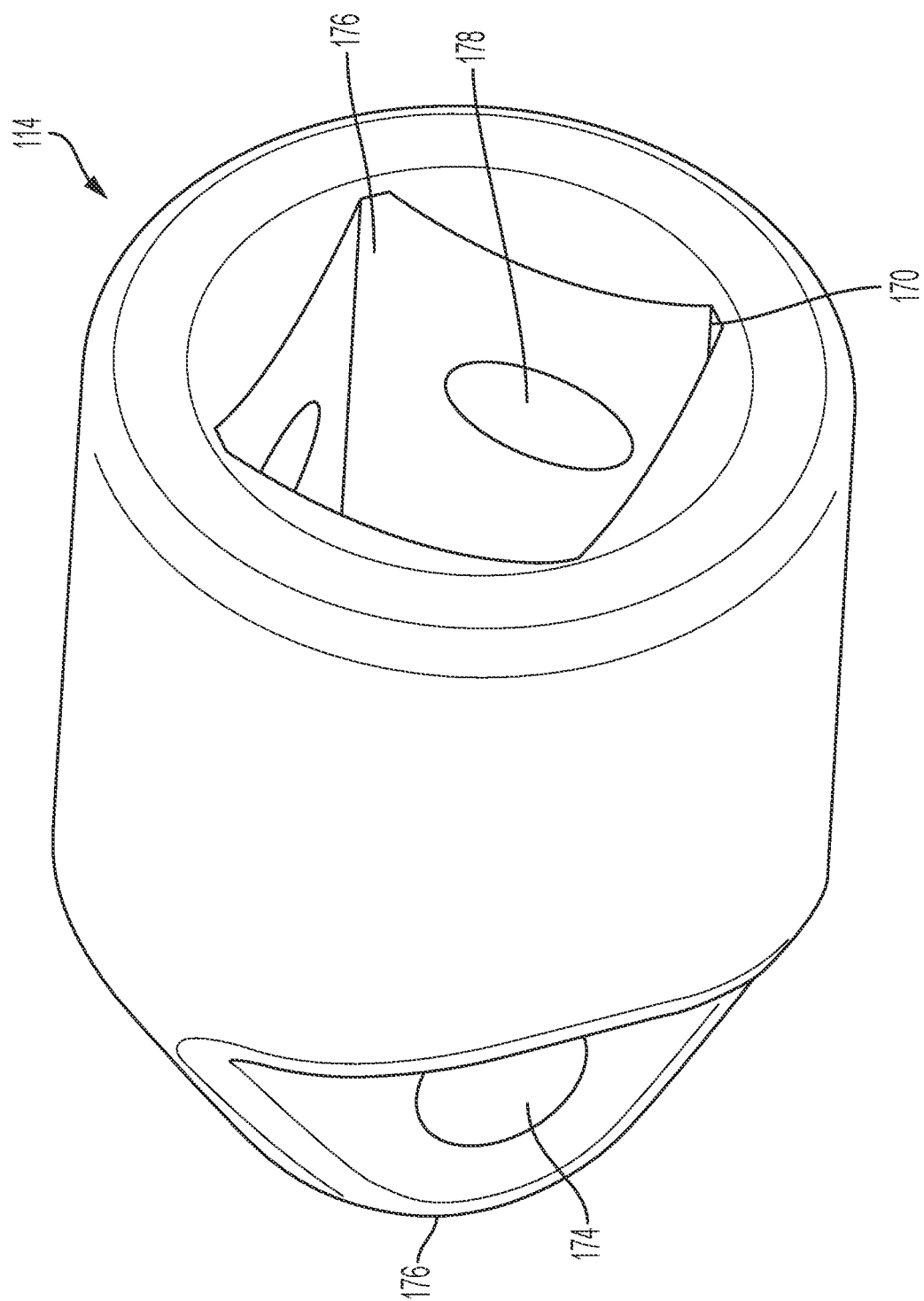
FIG. 7 is a perspective view of the female socket.

FIGS. 3 and 4 respectively show an assembled and exploded embodiment of a universal joint 100 according to the present invention. The universal joint 100 includes a central connector 110, a male connector 112 and a female connector 114.

The central connector 110 comprises a substantially cylindrical body 132 formed about an X-axis. The central connector 110 also includes a first pair of arms 134 that are integral to the body 132 and equidistant from the X-axis. The first pair of arms 134 are positioned at a first end 136 of the body 132. Each arm in the first pair 134 defines an opening 138 configured to receive a male axle 140. The openings 138 in the first pair of arms 134 are positioned on a Z-axis orthogonal to the X-axis. The central connector 110 also includes a second pair of arms 142 that are also integral to the body 132 and equidistant from the X-axis. The second pair of arms 142 are positioned on a second end 144 of the body 132. The second pair of arms 142 are oriented such that they are ninety degrees out of phase with the first pair of arms 134. Each arm in the second pair 142 defines an opening 146 configured to receive a female axle 148. The openings 146 in the second pair of arms 142 are positioned on a Y-axis orthogonal to both the X-axis and the Z-axis. The body 132 of the central connector 110 also includes a male spherically concave surface 150 between the first pair of arms 134. The body 132 also includes a female spherically concave surface 152 between the second pair of arms 142.

In an alternate embodiment, the body 132 also defines an opening 154 about the X-axis allowing communication between the male and female spherically concave surfaces 150, 152.

The male connector 112 of the universal joint 100 includes a square joint 156 and a male stirrup 158. The male stirrup 158 defines an axial opening 160. A tip 162 of the male stirrup 158 is spherical and configured to be received by the male spherically concave surface 150 of the central connector 110. The square joint 156 may further define a cavity 164. A spring 166 and ball 168 may be disposed within in the cavity 164. The spring 166 may be positioned so as to bias the ball 168 away from the square joint. Those skilled in the art will recognize that the spring 166 and ball 168 are configured to secure a torque driving head (not shown) to the square joint. The spring 166 and ball 168 mechanism also facilitates quick exchange of said torque driving heads The female connector 114 of the universal joint 100 includes a square socket 170 and a female stirrup 172 defining an axial opening 174. A tip 176 of the female stirrup 172 is spherical and configured to be received by the female spherically concave surface 152 of the central connector 110. One or more surfaces 176 interior to the square socket 170 may include a circular depression 178. Those skilled in the art will recognize that the circular depression 178 is configured to receive a ball (not show) from a square driver (not show) and secure the female connector to the square driver.

The universal joint 100 also includes a male axle 140 disposed in the opening 138 defined in the first pair of arms 134 of the central connector 110 and the axial opening 160 of the male stirrup 158 of the male connector 112. The male axle 140 is configured to secure the male connector 112 to the central connector 110. The male axle 144 also permits rotational movement of the male connector 112 about the Z-axis The universal joint 100 also includes a female axle 148 disposed in the opening 146 defined in the second pair of arms 142 of the central connector 110 and the axial opening 174 of the female stirrup 172 of the female connector 114. The female axle 148 is configured to secure the female connector 114 to the central connector 110. The female axle 148 also permits rotational movement of the female connector 114 about the Y-axis.

Figure 8:
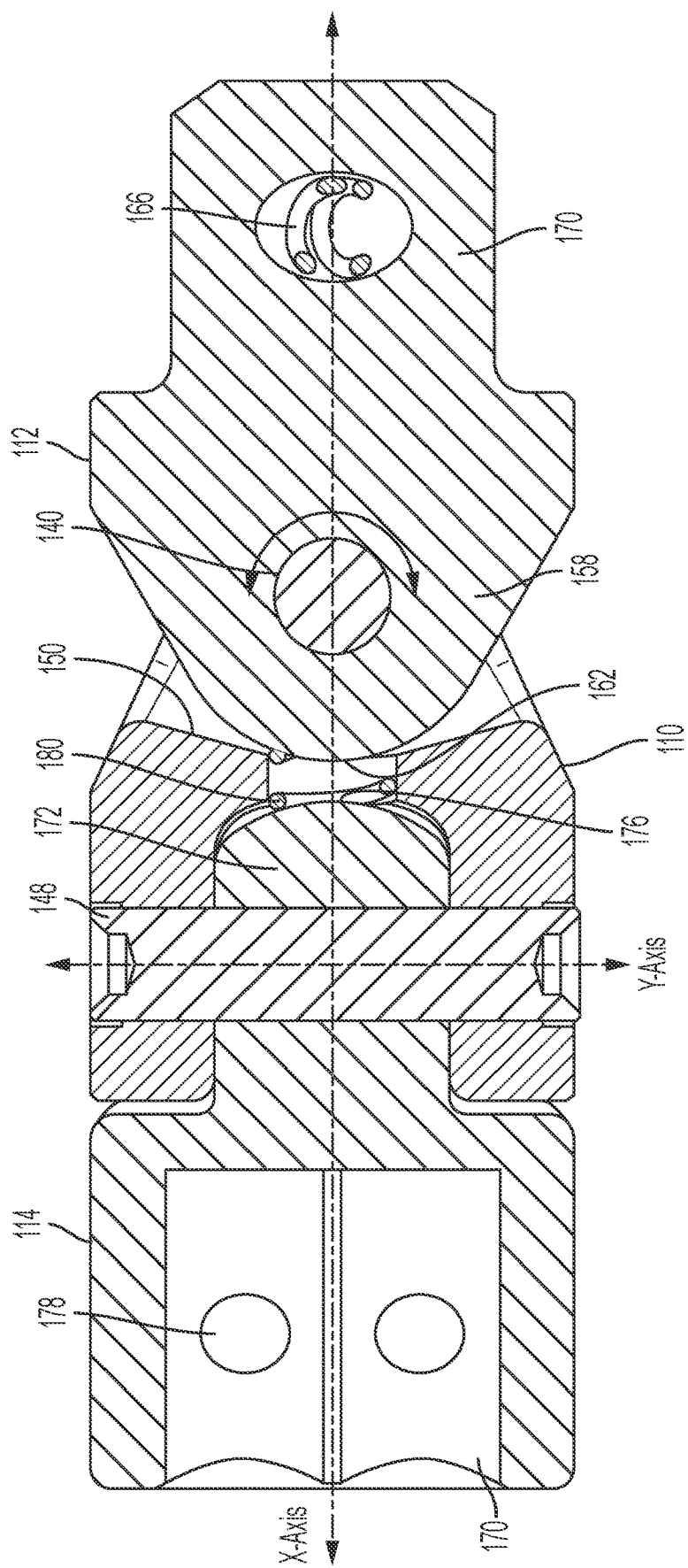
FIG. 8 is a X-Y plane cutaway view of the universal joint according to the present invention.
Figure 9:
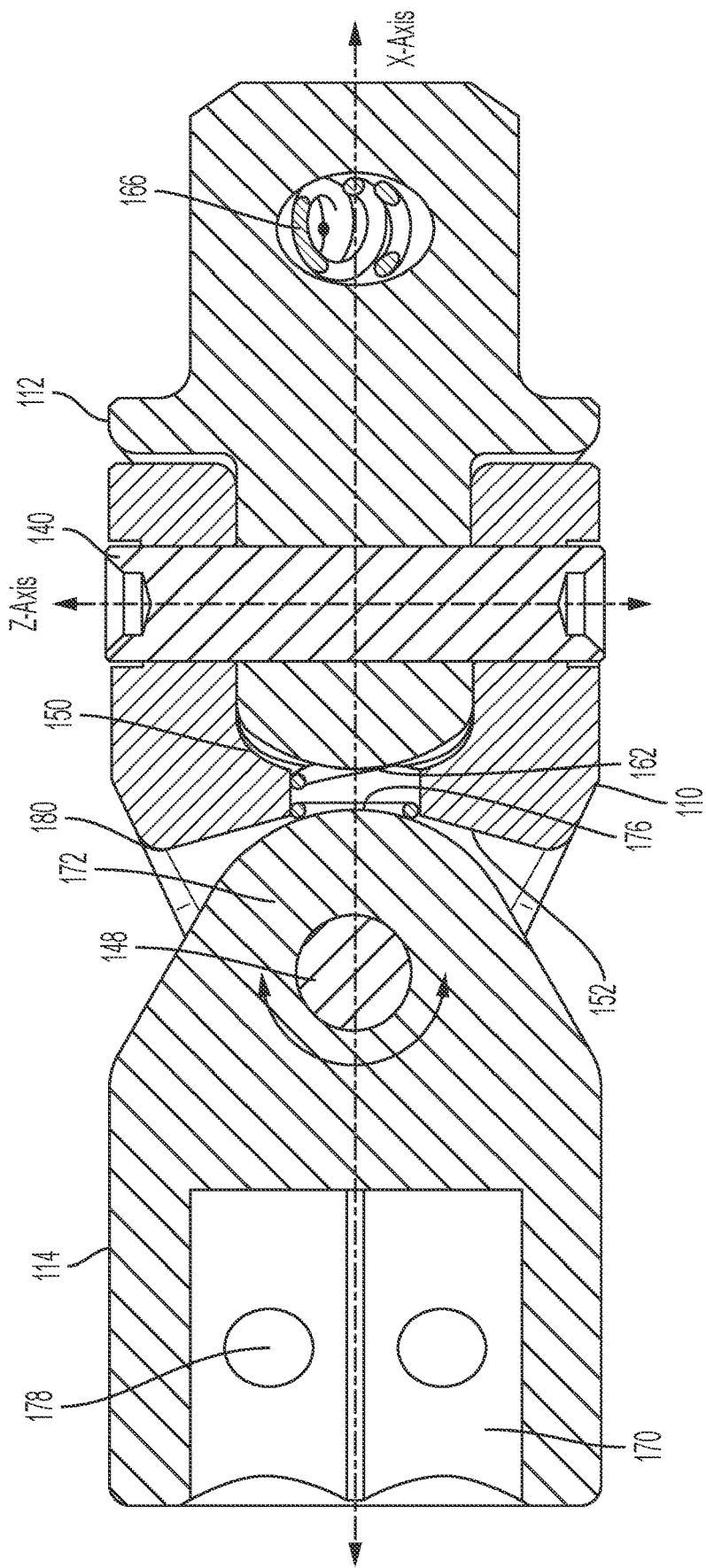
FIG. 9 is a X-Z plane cutaway of the universal joint according to the present invention.

As best shown in the cutaway views of FIGS. 8 and 9, the universal joint 100 also includes a positioning spring 180. The positioning spring 180 is disposed within the opening 154 between the male spherically concave surface 150 and the female spherically concave surface 152 of the central connector 110. The bias of the positioning spring 180 is such that the spring simultaneously engages the tips 162, 176 of both the male and female stirrups 158, 172. The positioning spring 180 can thus hold the male connector 112 in an operator selected position about the Z-axis. Simultaneously, the positioning spring 180 can also hold the female connector 114 in an operator selected position about the Y-axis.

INDUSTRIAL APPLICABILITY

Universal joints are useful for applying torque to an object in tight space or at awkward angles. In operation, a user may connect the female connector to a socket wrench. A socket head, sized according to the object to be driven, may be applied to the male driver. The socket head is then applied to the object to be driven. An operator may then apply torque to the object by rotating the socket wrench. Rotation of the socket wrench applies torque to the female connector. Said torque is then transmitted through the central connector to the male driver. The male driver transfers the torque to the socket head and ultimately to the object to be driven. Transferring torque through the central connector is essential to the operation of universal joints. However, the design of the central connectors of the prior art leads to premature wear and failure.

Figure 1:
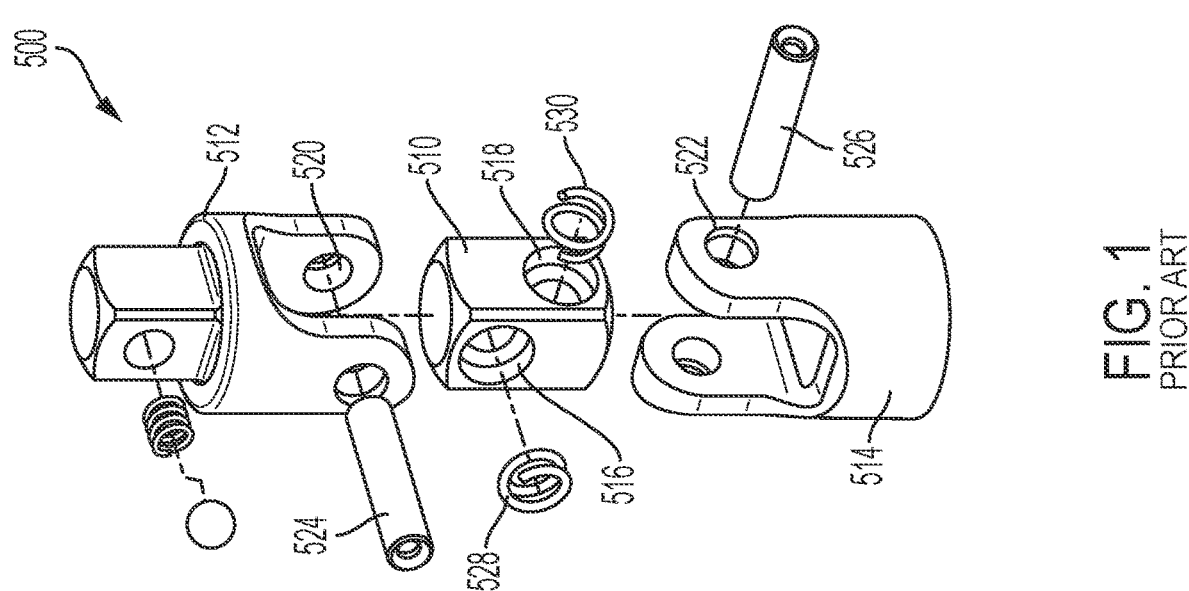
FIG. 1 illustrates an exploded view of a universal joint according to the prior art.

The prior art universal joint 500 as shown in FIG. 1, includes a block type central connector 510. When the universal joint 500 is in operation, the torque is generally transferred from the female axle 526 through the central connector 510 and to the male axle 524. While functional, this design puts undue stress on the interior surfaces of openings 518, 516, which respectively house the female and male axles 526, 524. Over time, this stress causes openings 518, 516 to get wider. As this occurs, the respective set springs 530, 528 can no longer maintain their bias to hold the respective to hold the respective female connector 514 and male connector 512 in a desired position set by the operator. When this happens, the female connector 514 and male connector 512 haphazardly fall under their own weight rotating about their respective Y and Z axes into a position of least potential energy. This condition is undesirable because it makes the universal joint difficult to maneuver and operate. Moreover, in comparison to the strength of the central connector 510, female and male axles 526, 524 are relatively weak. This may cause a failure, wherein the universal joint breaks.

Figure 2:
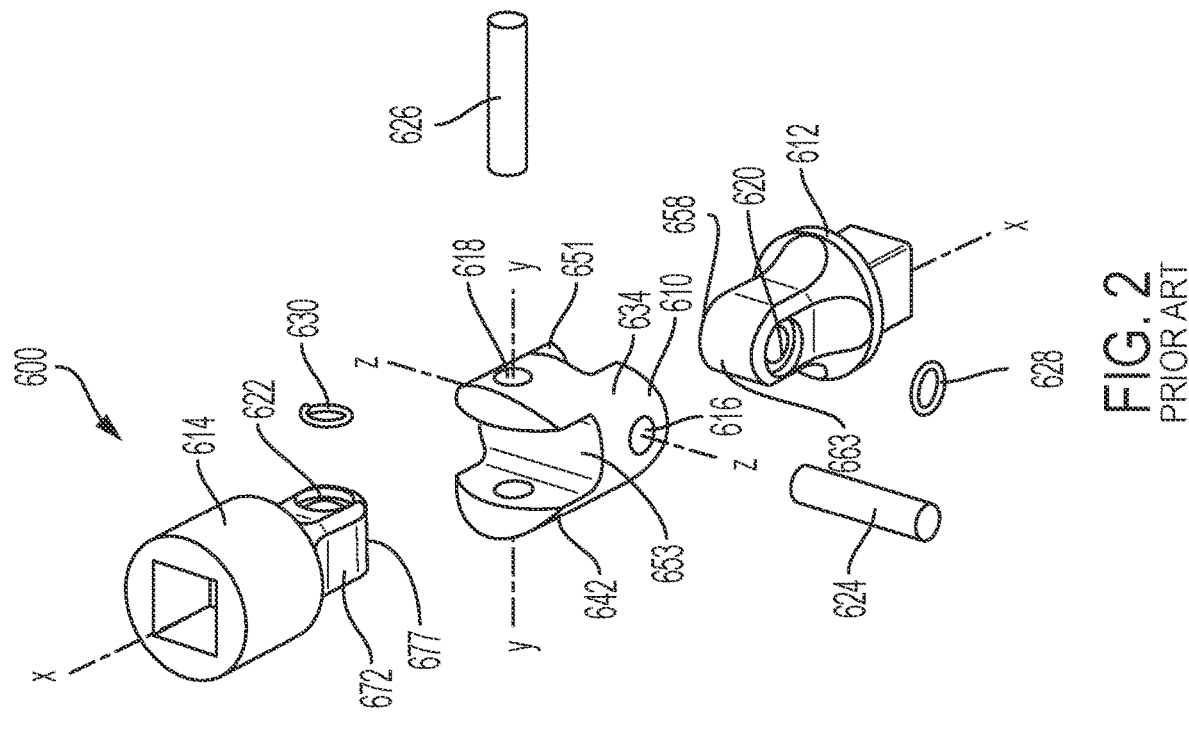
FIG. 2 illustrates an exploded view of another universal joint according to the prior art.

The prior art universal joint 600 as shown in FIG. 2, includes a stirrup type central connector 610. This design attempts to address the aforementioned shortcomings by relieving some of the stress that goes through the female axle 626 and male axle 624. This is achieved by utilizing a portion of the surface of the female stirrup 672 to transfer torque to the interior surface of the second pair of arms 642. Similarly, torque is transferred from the interior surface of the first pair of arms 634 to a portion of the surface of the male stirrup 658. The stirrup type central connector 610 may have some incremental benefits over the block type central connector 510, it does not completely address the issues of failure and wear. This is because design of the central connector 610 and respective female stirrup and male stirrup allow only portions of the stirrup to transfer torque. Specifically, the respective female stirrup 626 and male stirrup 624 are cylindrically rounded at their respective tips 677, 663. Correspondingly, the central connector 610 includes flat surfaces 653, 651 for receiving the cylindrically rounded tips 677, 663. Thus, the tips 677, 663 play no part in transferring torque. Moreover, this design does not completely eliminate the torque caused stress on the respective female and male axles 626, 624. As described above, over time, this stress causes openings 622, 620 to get wider. As this occurs, the respective set springs 630, 628 can no longer maintain their bias to hold the respective to hold the respective female connector 614 and male connector 612 in a desired position set by the operator. When this happens, the female connector 614 and male connector 612 haphazardly fall under their own weight rotating about their respective Y and Z axes into a position of least potential energy. This condition is undesirable because it makes the universal joint difficult to maneuver and operate.

The central connector of the present invention is advantageous over the prior art because of the male spherical concave surface 150 and the female spherical concave surface 152. The male and female spherical concave surfaces 150, 152 are respectively configured to receive spherical tips 176, 162. The engagement of the spherical tips 176, 162 to the spherical concave surfaces 152, 150 maximizes the amount of surface area available to transfer torque. Specifically, the central connector 110 of the present invention permits the use of surface area at the tips 176, 162 to assist in the transfer of torque. By maximizing the amount of surface area used to transfer torque, wear in the central connector is reduced thereby leading to longer useful life before failure.

Moreover, in an alternate embodiment, the central connector 110 solves the problem of wear leading to set spring failure. In the prior art, the set springs are placed in the same openings that house the respective male and female axles. Because no universal joint can completely eliminate the stress that is transferred through the axles, eventually, wear will occur and the set springs will no longer be able to perform their function of holding the respective male or female connector in the operators desired position. The present invention, however, does not house the set spring within the same opening as the male and female axles. Instead, the present invention houses the set spring 180 in an opening 154 about the X-axis. Because a relatively small amount of torque related stress goes through this opening there is little to no wear. Thus, the set spring 180 disposed therein remains intact and able to perform its function over a much longer portion of the life of the product.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A central connector for a universal joint comprising:
a substantially cylindrical body formed about an X-axis;
a first pair of arms that are integral to the body and equidistant from the X-axis, wherein said first pair of arms are positioned at a first end of the body, and wherein the first pair of arms define openings configured to receive a male axle positioned on a Z-axis orthogonal to the X-axis;
a second pair of arms that are integral to the body and equidistant from the X-axis, wherein said second pair of arms are positioned at a second end of the body opposite to the first end, and wherein the second pair of arms are oriented such that they are orthogonal to the first pair of arms, and wherein the second pair of arms define openings configured to receive a female axle positioned on a Y-axis orthogonal to both the X-axis and the Z-axis; and
characterized in that the body further includes a male spherically concave surface between the first pair of arms and a female spherically concave surface between the second pair of arms.

2. The central connector of claim 1, wherein the body defines an opening about the X-axis allowing communication between the male and female spherically concave surfaces.

3. A universal joint comprising:
a central connector according to claim 2;

a male connector comprising a square joint and a male stirrup defining an axial opening, and wherein a tip of the male stirrup is spherical and configured to be received by the male spherically concave surface of the central connector;

a female connector comprising a square socket and a female stirrup defining an axial opening, and wherein a tip of the female stirrup is spherical and configured to be received by the female spherically concave surface of the central connector;

a male axle be disposed within the openings of the first pair of arms and the axial opening of the male stirrup, and configured to simultaneously secure the male connector to the central connector and allow the male connector to rotate about the Z-axis;

a female axle disposed within the opening of the second pair of arms and the axial opening female stirrup, and configured to simultaneously secure the female connector to the central connector and allow the female connector to rotate about the Y-axis; and a positioning spring disposed in the body opening about the X-axis and configured to engage the tips of the male stirrup and the female stirrup to hold the respective male connector and female connector in a selected position.

4. The universal joint of claim 3, wherein the male connector is configured to rotate about the Z-axis through a range of motion greater than 180 degrees relative to the X-axis.

5. The universal joint of claim 4, wherein the female connector is configured to rotate about the Y-axis through a range of motion greater than 180 degrees relative to the X-axis.

6. The universal joint of claim 3, wherein the female connector is configured to rotate about the Y-axis through a range of motion greater than 180 degrees relative to the X-axis.

* * * * *